UNITED STATES PATENT OFFICE.

CARL HOFFMANN, OF HÖCHST-ON-THE-MAIN, GERMANY, ASSIGNOR TO THE FARBWERKE, VORMALS MEISTER, LUCIUS & BRÜNING, OF SAME PLACE.

GREEN DYE AND PROCESS OF MAKING SAME.

SPECIFICATION forming part of Letters Patent No. 615,485, dated December 6, 1898.

Application filed December 28, 1897. Serial No. 664,081. (Specimens.)

*To all whom it may concern:*

Be it known that I, CARL HOFFMANN, doctor of philosophy, a citizen of the Empire of Austria-Hungary, residing at Höchst-on-the-Main, Germany, have invented certain new and useful Improvements in the Manufacture of Dyestuffs Fast to Alkali of the Triphenylmethane Series, of which the following is a specification.

This invention relates to the production of dyestuffs fast to alkali of the triphenylmethane series.

I have found that valuable green to blue-green dyestuffs may be obtained from meta-oxysulfonic acids of the benzene or naphthalene series, having the general formula:

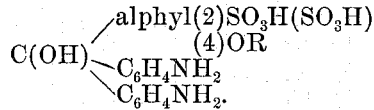

They, therefore, are dyestuffs which contain a sulfo group linked in ortho position to the carbon of the methane as well as an alkyloxyl in para position. The new dyestuffs are fast to alkali in contrast to those which have a hydroxyl instead of an alkyloxyl.

The method for the manufacture of these new dyestuffs consists in condensing tetraälkyl-paradiamidobenzhydrol—for example, tetramethyl-tetraethyl, or dialkyldibenzyl-paradiamido benzhydrol, with metaälkyloxysulfonic acids, such as meta-methoxybenzenesulfonic acid, 1.3 methoxy-napthalene sulfonic acid, 1.3.6 methoxynapthalene-disulfonic acid, and oxidizing the leuco compounds thus formed. If a monosulfonic acid be employed, a further sulfonation is necessary either before or after oxidation of the leuco compounds.

The metaälkyloxysulfonic acids may be obtained from the alkali salts of the corresponding oxysulfonic acids by the action of methyl or ethyl sulfate of sodium.

Example: A mixture of ten parts, by weight, of symmetric dialkyldibenzylparadiamidobenzhydrol, and five parts, by weight, of the sodium salt of metaälkyloxybenzene-sulfonic acid are introduced, with stirring and gentle cooling, into fifty parts, by weight, of sulfuric acid of 66° Baumé. As soon as the yellow color of the solution has disappeared it is poured on ice, filtered off, and well washed with water.

For the sulfonation the dried leuco body is dissolved in five times the quantity of fuming sulfuric acid of twenty per cent. As soon as a sample of it is completely soluble in water the whole is poured on ice and neutralized with lime.

For the oxidation of the easily-soluble calcium salt of the leucosulphonic acid obtained by evaporation of the solution filtered from sulfate of lime ten parts, by weight, of this salt are dissolved in about three hundred parts, by weight, of water and treated with the calculated quantity of diluted sulfuric acid and peroxid of lead paste of ten per cent. Thereupon it is filtered from the lead sulfate and the dyestuff solution evaporated to dryness.

The dyestuff forms a dark copper-red brilliant substance soluble in water with a green color, almost insoluble in alcohol, and easily soluble in concentrated sulfuric acid with a brown-yellow color. The aqueous solution turns light green on addition of an excess of mineral acid, but keeps its original color on addition of caustic soda-lye in the cold. It dyes wool in an acid-bath a green shade fast to alkali.

Having now described my invention, what I claim is—

1. The process herein described of manufacturing green to blue-green dyestuffs, which consists in condensing metaälkyloxysulfonic acids with tetraälkyl-paradiamidobenzhydrols, and then oxidizing the leucosulfonic acids thus obtained with peroxid of lead, substantially as set forth.

2. The process herein described of manufacturing green to blue-green dyestuffs, which consists in condensing metaälkyloxysulfonic acids with tetraälkyl-paradiamidobenzhydrols, sulfonating with fuming sulfuric acid, and then oxidizing the leucosulfonic acids thus obtained with peroxid of lead, substantially as set forth.

3. As a new product, the dyestuff obtained by condensing molecular quantities of a metaälkyloxysulfonic acid with symmetrical dialkyldibenzyl-paradiamidobenzhydrol and subsequent sulfonation and oxidation, forming a dark copper-red brilliant substance, soluble in water with a green color, soluble with difficulty in alcohol, easily soluble in concentrated sulfuric acid with a brown-yellow color, and dyeing wool in an acid-bath a green shade fast to alkali, substantially as set forth.

In testimony that I claim the foregoing as my invention I have signed my name in presence of two subscribing witnesses.

CARL HOFFMANN.

Witnesses:
HEINRICH HAHN,
ALFRED BRISBOIS.